United States Patent
Dietsch et al.

(10) Patent No.: US 9,401,257 B2
(45) Date of Patent: Jul. 26, 2016

(54) CIRCUIT PROTECTION DEVICE

(71) Applicants: G. Todd Dietsch, Park Ridge, IL (US); Olga Spaldon-Stewart, Des Plaines, IL (US); Stephen Whitney, Lake Zurich, IL (US)

(72) Inventors: G. Todd Dietsch, Park Ridge, IL (US); Olga Spaldon-Stewart, Des Plaines, IL (US); Stephen Whitney, Lake Zurich, IL (US)

(73) Assignee: LITTELFUSE, INC., Chicago, IL (US)

( * ) Notice: Subject to any disclaimer, the term of this patent is extended or adjusted under 35 U.S.C. 154(b) by 326 days.

(21) Appl. No.: 13/975,728

(22) Filed: Aug. 26, 2013

(65) Prior Publication Data

US 2013/0335187 A1    Dec. 19, 2013

Related U.S. Application Data

(62) Division of application No. 12/953,201, filed on Nov. 23, 2010, now Pat. No. 8,531,263.

(60) Provisional application No. 61/263,992, filed on Nov. 24, 2009.

(51) Int. Cl.
*H01H 85/02* (2006.01)
*H01H 85/00* (2006.01)
*H01H 85/041* (2006.01)

(52) U.S. Cl.
CPC ....... *H01H 85/0241* (2013.01); *H01H 85/0039* (2013.01); *H01H 85/0047* (2013.01); *H01H 85/0052* (2013.01); *H01H 85/0417* (2013.01)

(58) Field of Classification Search
CPC .......... H01H 85/0417; H01H 85/0241; H01H 85/0052; H01H 85/0047; H01H 85/0039
USPC ........................... 337/290, 401, 153, 182–184
See application file for complete search history.

(56) References Cited

U.S. PATENT DOCUMENTS

| | | | |
|---|---|---|---|
| 4,710,791 A * | 12/1987 | Shirato | H01L 23/585 257/363 |
| 5,612,662 A | 3/1997 | Drekmeier et al. | |
| 5,726,621 A * | 3/1998 | Whitney | H01H 85/0411 337/283 |
| 5,770,993 A | 6/1998 | Miyazawa et al. | |
| 5,914,649 A * | 6/1999 | Isono | H01H 85/0411 337/290 |
| 5,939,969 A * | 8/1999 | Doerrwaechter | H01H 37/761 337/152 |
| 6,034,589 A * | 3/2000 | Montgomery | H01H 85/0411 29/623 |
| 6,452,475 B1 * | 9/2002 | Kawazu | H01H 85/463 29/623 |
| 7,385,475 B2 * | 6/2008 | Bender | H01H 69/022 337/227 |
| 2001/0020888 A1* | 9/2001 | Schon | H01H 85/46 337/142 |
| 2011/0211284 A1 | 9/2011 | Yoneda | |
| 2015/0084734 A1* | 3/2015 | Yoneda | H01H 37/761 337/183 |

FOREIGN PATENT DOCUMENTS

| | | | |
|---|---|---|---|
| CN | 101197230 A | 6/2008 |
| JP | 57107530 A | 7/1982 |
| JP | 08298058 A | 11/1996 |
| JP | 11144604 A | 5/1999 |
| JP | 11185579 A | 7/1999 |
| JP | 2007149512 A | 6/2007 |
| JP | 2009259724 A | 11/2009 |

* cited by examiner

*Primary Examiner* — Anatoly Vortman

(57) ABSTRACT

A circuit protection device includes a conductive layer which is connected to first and second terminals. A spring is electrically connected to the first and second terminals. When an over-voltage or over-temperature condition occurs within a charging circuit, one or more heat generating resistive elements melts material associated with one or more of the ends of the spring thereby releasing the spring to create an open circuit.

7 Claims, 14 Drawing Sheets

CIRCUIT PROTECTION DEVICE

CROSS-REFERENCE TO RELATED APPLICATION

This application is a divisional of U.S. patent application Ser. No. 12/953,201, filed Nov. 23, 2010, now U.S. Pat. No. 8,531,263, which claims priority to U.S. Provisional Patent Application No. 61/263,992, filed Nov. 24, 2009, all of which are hereby incorporated by reference into this application.

BACKGROUND OF THE INVENTION

1. Field of the Invention

Embodiments of the invention relate to the field of circuit protection devices. More particularly, the present invention relates to a protection device that generates heat in an over-voltage or over-temperature situation which melts connections to a spring which then operates creating an open circuit thereby protecting a power source and related circuitry.

2. Discussion of Related Art

Over-voltage and over-temperature protection devices utilize thermal links which can melt during an abnormal situation to form an open circuit. These protection devices may be disposed between, for example, a charger and a plurality of rechargeable battery cells (e.g. Li ion batteries). When a voltage that is larger than the threshold voltage is applied to the sensing and trigger circuitry, current flows through heat generating members causing one of more thermal links to melt. Once the links are melted, an open circuit is created which prevents the over-voltage condition from damaging the battery cells. In another type of protection device, thermal cut-off functionality is used to protect the power source, e.g. battery cells. When the temperature of the cells exceeds a particular threshold level, one or more thermal links melt creating an open circuit thereby separating the charging device from the battery cells. However, the thermal coupling between the cells where the over-temperature condition exists and the thermal links may not be sufficient to ensure adequate response time, resulting in a thermal run-away condition. Accordingly, there is a need to provide a protection device configured to result in a sufficiently fast response to protect the battery cells.

SUMMARY OF THE INVENTION

Exemplary embodiments of the present invention are directed to a protection device disposed between a charger and a one or more battery cells to be charged. In an exemplary embodiment, a protection device includes an electrically conductive spring, a pair of low melting members and one or more heat generating resistive elements disposed on a substrate. The electrically conductive spring has a first end connected to a first of the pair of low melting members and a second end connected to a second of the pair of low melting members. The low melting members may be solder joints that melt from the heat generated by the resistive elements. When at least one of the solder joints melts sufficiently in response to current generated from an over-voltage or over-temperature condition, the corresponding end of the spring snaps opening the circuit formed between the solder joints and the spring, thereby creating an open circuit.

In another exemplary embodiment of the present invention a protection device includes a substrate, a conducting layer, a resistive element, a conducting pad, a diffusion layer and a glass layer. The conducting layer is disposed on the substrate and has at least a first and second terminals. The resistive element is disposed at least partially on the conducting layer. The conducting pad is disposed over the resistive element. The diffusion layer is disposed over the conducting pad. The glass layer is disposed over the diffusion layer wherein when an abnormal circuit condition occurs heat is generated by the resistive element which causes a portion of the diffusion layer to diffuse into the glass layer to create an open circuit between the first and second terminals.

In another exemplary embodiment of the present invention a protection device includes a substrate; a conducting layer disposed on the substrate where the conducting layer has at least a first and second terminals; a resistive element is disposed at least partially on the conducting layer; a conducting pad is disposed over the resistive element; a thermal link layer is disposed over the conducting pad; and a hot melt adhesive (HMA) cover layer is disposed over the thermal link layer wherein when an abnormal circuit condition occurs heat is generated by the resistive element which causes a portion of the HMA layer to absorb the thermal link layer to create an open circuit between the first and second terminals.

DESCRIPTION OF EMBODIMENTS

Figure 1A:
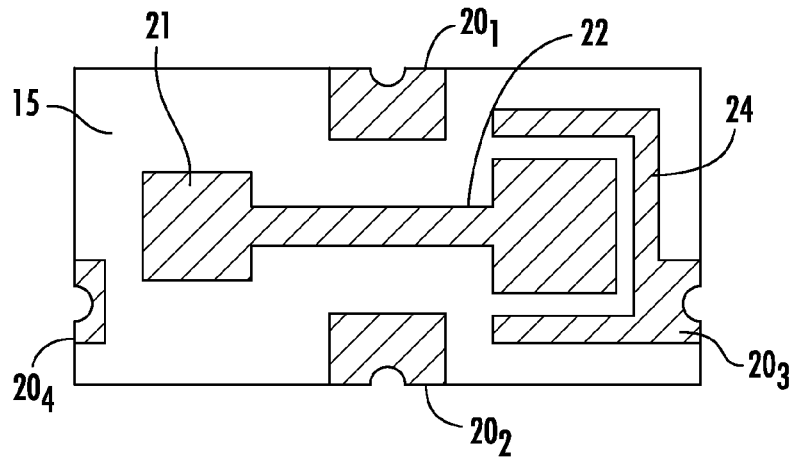
FIGS. 1A-1K illustrate layers of a protection device in accordance with an embodiment of the present disclosure.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

In the following description and/or claims, the terms "on," "overlying," "disposed on" and "over" may be used in the following description and claims. "On," "overlying," "disposed on" and "over" may be used to indicate that two or more elements are in direct physical contact with each other. However, "on,", "overlying," "disposed on," and over, may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

FIG. 1A-1K illustrate a circuit protection device 10 in accordance with the present disclosure. A first layer 12 is defined by metallized conducting paths 22, 24 and first terminal $20_1$, second terminal $20_2$, third terminal $20_3$ and fourth terminal $20_4$ disposed on substrate 15. Metallized conducting path 22 includes pad 21. First terminal $20_1$ and second terminal $20_2$ are used to connect the protection device 10 between a source of charge and a device to be protected, for example, a plurality of battery cells. Third terminal $20_3$ is connected to conducting path 24 and provides an electrical connection to a control circuit (e.g. sensing circuit and transistor) which provides an over-voltage or over-temperature signal to protection device 10.

Figure 1B:
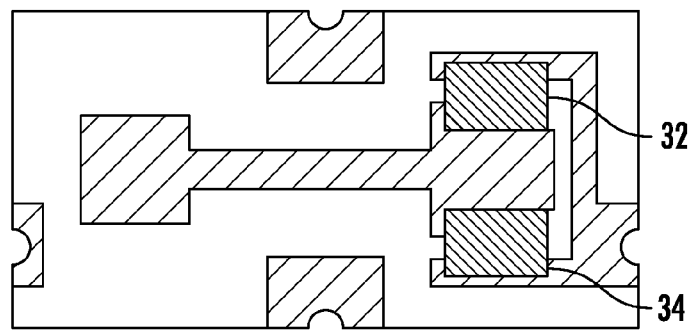

FIG. 1B illustrates a first resistive element 32 and second resistive element 34 disposed on and between conducting paths 22 and 24. Alternatively, a single resistive element which extends between the paths may be used or just one resistive element may be employed to create enough heat to melt at least one solder joint as described below. Alternative geometries for the resistive elements 32 and 34 may be modified to provide robustness to the voltage applied thereto. These geometries are intended to provide heat to the solder pads 46, 47 for a longer period of time, if necessary, as described in more detail below.

Figure 1C:
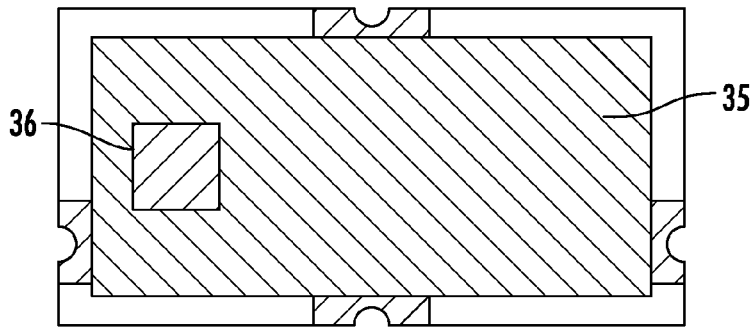

FIG. 1C illustrates a dielectric layer 35 disposed on substrate 15 which covers resistive elements 32 and 34. An opening 36 is formed through dielectric layer 35 to provide a connection means to conducting path 22. Dielectric layer 35 may be, for example, a glass having a desired thermal conductivity to allow heat generated by the resistors 32, 34 to pass therethrough.

Figure 1D:
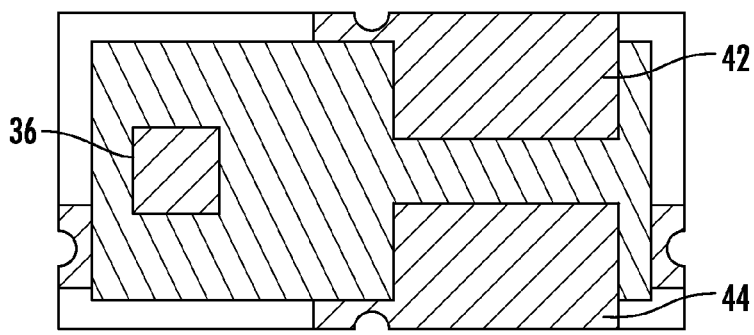

FIG. 1D illustrates a first conducting pad 42 disposed on dielectric layer 35 above first resistive element 32 and a second conducting pad 44 disposed on dielectric layer 35 above second resistive element 34. First conducting pad 42 forms a connection with first terminal $20_1$ and second conducting pad 44 forms a connection with second terminal $20_2$.

Figure 1E:
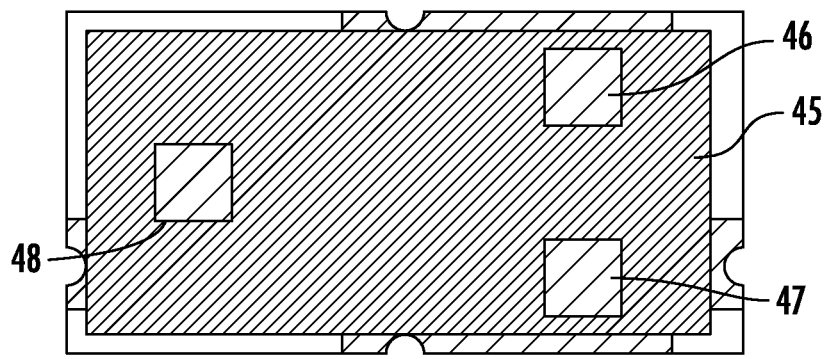

FIG. 1E illustrates a dielectric layer 45 for example, glass, disposed partially over conducting pads 42, 44 and opening 36, resulting in exposed portions of the underlying conducting pads which become solder joint pads 46, 47 and 48. Low temperature melt solder is disposed on solder pads 46, 47 and 48. Pad 48 is used to conduct current from a spring (shown in FIG. 1F) to a control circuit via terminal $20_3$ during an abnormal circuit condition as discussed below.

Figure 1F:
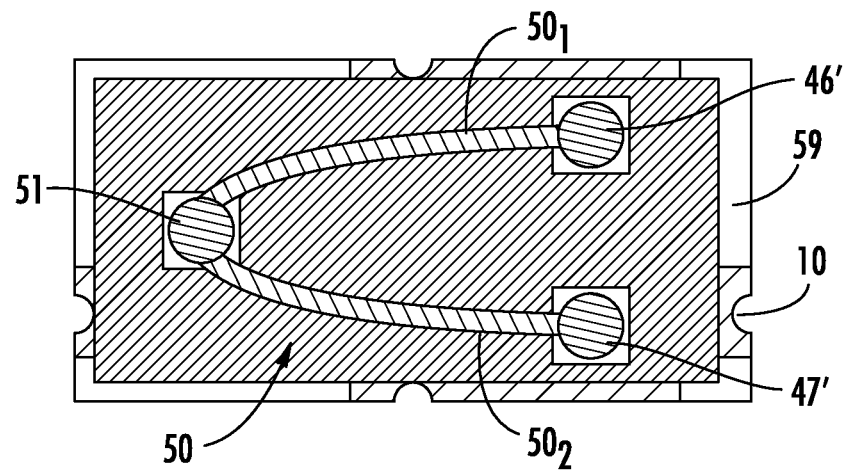
Figure 6:
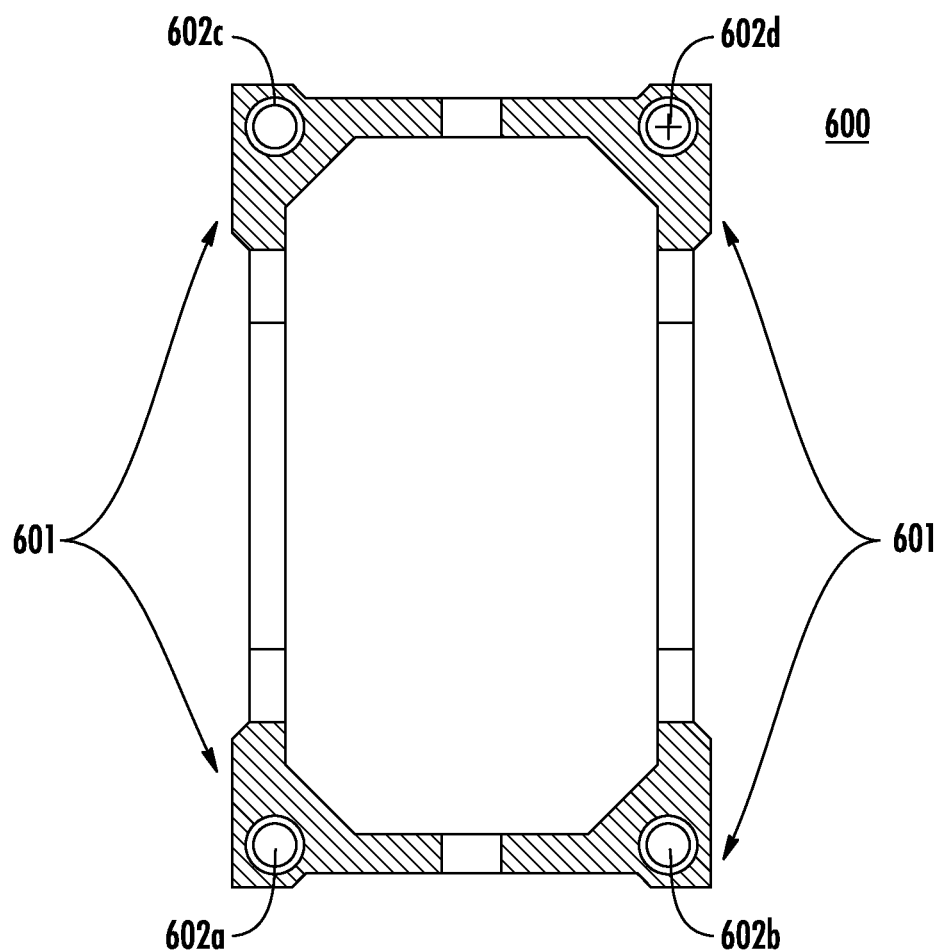
FIG. 6 illustrates a top plan view of an exemplary cover of a protection device in accordance with an embodiment of the present disclosure.

FIG. 1F illustrates a generally "U" shaped flat spring 50 having a pair of sides $50_1$, $50_2$ extending from an apex portion 51. The respective ends of the sides $50_1$, $50_2$ are connected to solder pads 46 and 47 using solder 46', 47' and the apex 51 is soldered to solder pad 48. Spring 50 may be made from, for example, high carbon steel plated with silver, a shape memory alloy material, or similar conducting material and may, of course, have alternative configurations. A plastic cover (as shown in FIG. 6) is disposed over the circuit protection device 10 and glued about ledge 59 around the perimeter of substrate 12.

Figure 1G:
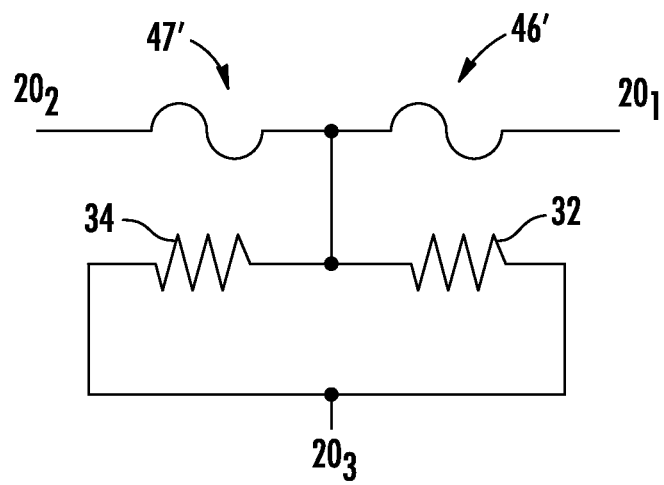

FIG. 1G is a schematic view of protective device 10 including resistive elements 32, 34, low melt solder material 46', 47' and first terminal $20_1$, second terminal $20_2$ and third terminal $20_3$. The location of the solder pads 46 and 47 (and consequently resistive elements 32 and 34) may be located more toward the apex portion 51 of spring 50 along spring sides $50_1$ and/or $50_2$. This may be used to increase the reliability when the soldered connections 46' and 47' melt causing spring 50 to create an open circuit. In addition, the geometry of the solder pads 46, 47 (and 48) may be modified to increase the surface area if more solder is needed to retain spring 50 in position. Furthermore, more than one solder pad 46, 47 may be associated with each spring side $50_1$, $50_2$. In particular, spring side $50_1$ may include pad 46 as well as another pad disposed between pad 46 and pad 48 at the apex of spring 50. Similarly, spring side $50_2$ may include pad 47 and another pad disposed between pad 47 and 48 at the apex of spring 50. Consequently, additional soldered connections would also be employed with each additional pad and the associated resistive element (e.g. resistive element 32 for pad 46) or an additional resistive element would be utilized to melt the soldered connection.

Figure 1H:
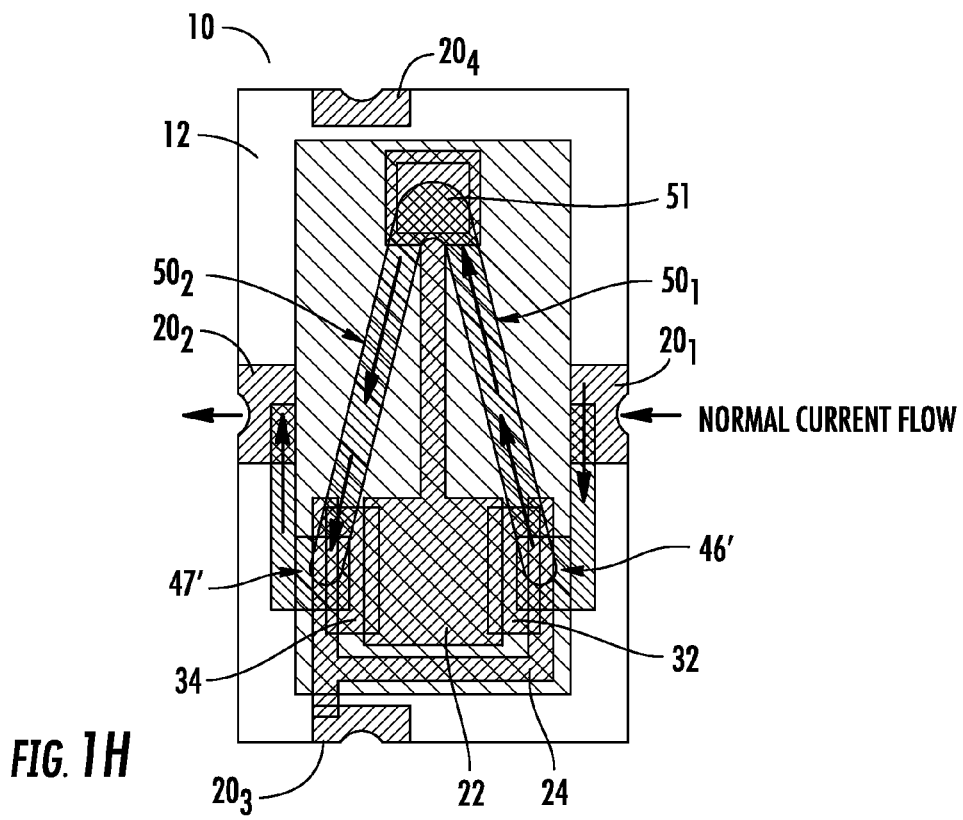

FIG. 1H is a plan view of the various layers of the protection device 10 shown in shadow disposed on substrate 12 and the associated current flow in a normal conducting situation. During normal operation, current flows (as indicated by the solid arrows) from terminal $_2 0_1$ to terminal $_2 0_2$ the device to be protected.

Figure 1I:
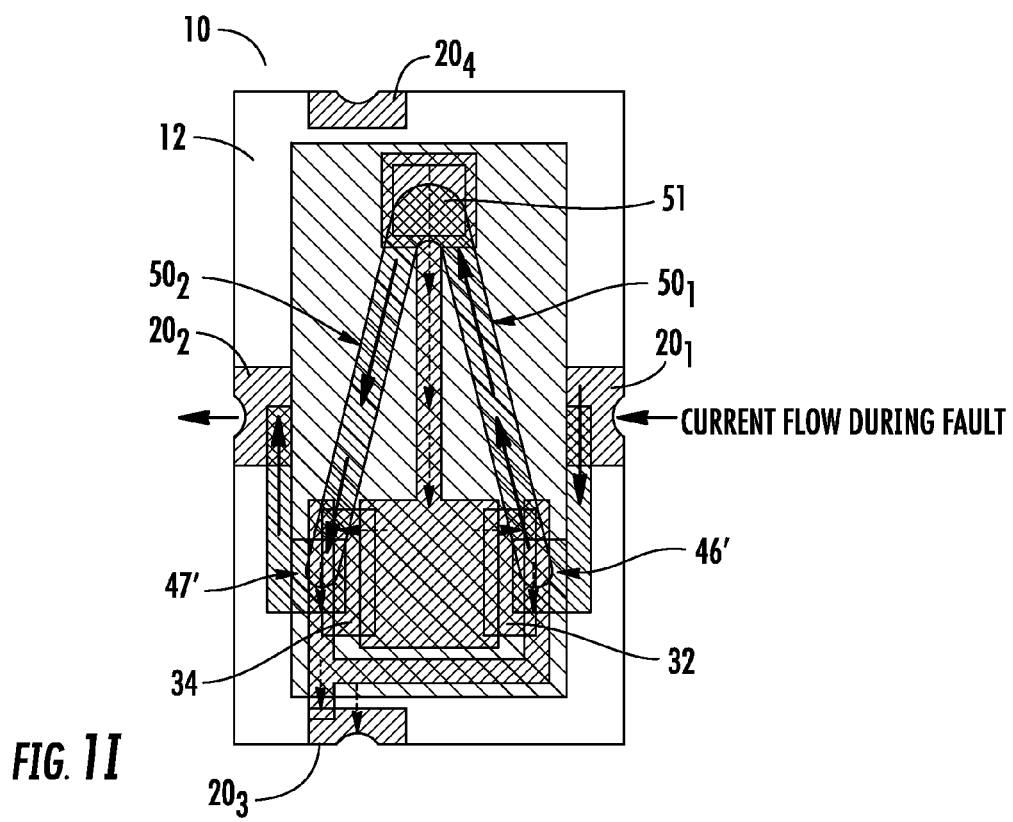

As shown in FIG. 1I, when an over-voltage or over-temperature situation is detected, a control circuit (not shown) connected to terminal $20_3$ closes the circuit and draws current from the spring 50 via conducting path 22. This current (indicated by the dashed arrows) flows through resistors 32 and 34 which produces heat and melts one or more of the soldered connections 46' and/or 47' via conducting pads 42 and 44. The solder material used may include flux which prevents oxidation of the surface of the solder when it melts, which otherwise might result in smearing or dragging of the solder during spring operation. The melting of one of more of the solder joints snaps at least one of the sides $50_1$, and/or $50_2$ of spring 50 closed. This creates an open circuit between the source of charge and the device to be protected.

Figure 1J:
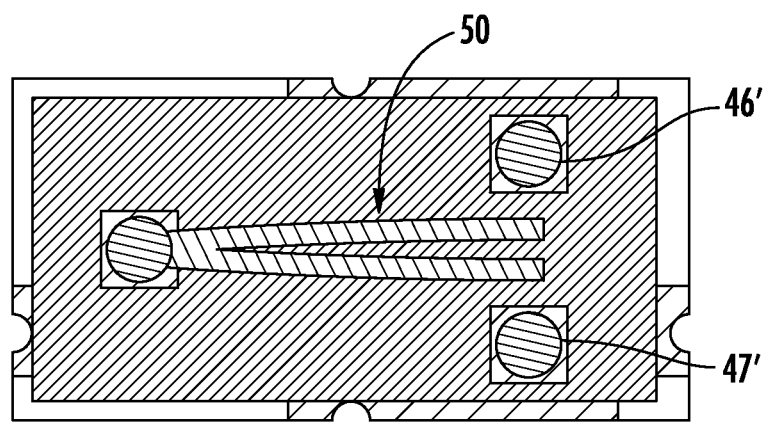

FIG. 1J illustrates the spring 50 after the abnormal circuit condition has occurred based on the melting of both the solders 46', 47' from the heating of resistive elements 32 and 34. Of course, if only a single resistor configuration is used, wherein the resistor extends under solder pads 46 and 47, the protection device operates in a similar fashion. In this manner, protection device 10 utilizes a spring disposed within a plurality of layers that produces an open circuit when an undesirable electrical or thermal condition occurs within a battery or charging circuit. In an alternative embodiment, only one of the spring sides (e.g. $50_1$) may be displaced and the other spring side (e.g. $50_2$) is stationary of fixed in position. The same solder pads and solder material may be used to retain the stationary spring side in place since a resistive element may not be located beneath the solder pad, thereby avoiding the heating of the solder material.

Figure 1K:
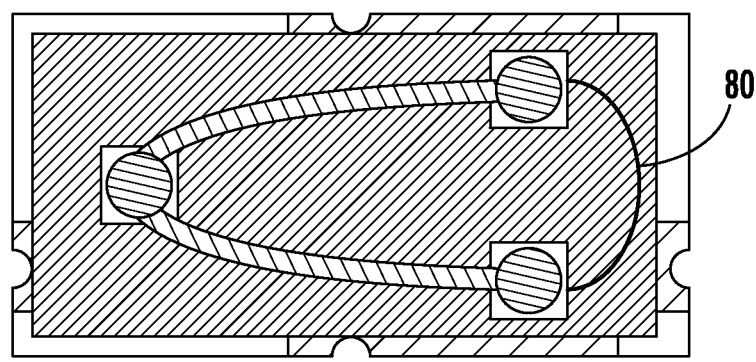

Alternatively (as shown in FIG. 1K), protection device 10 may include a major current carrying shunt 80 connected between the ends of spring 50. Under normal charge and discharge conditions, shunt 80 carries the majority of the current allowing the use of spring alloys with higher electrical resistance but improved spring properties. When an over-voltage or over-temperature condition occurs, the resistive elements 32 and 34 heat forcing the spring to lose contact with at least one of the solder pads 46 and 47, thereby compressing the shunt to produce an open circuit.

FIG. 2A-2J illustrates a circuit protection device 10' in accordance with the present disclosure. A first layer 12 is defined by metallized conducting paths 22, 24 and first terminal $20_1$, second terminal $20_2$, third terminal $20_3$ and fourth terminal $20_4$ disposed on substrate 15. Metallized conducting path 22 includes pad 21. First terminal $20_1$ and second terminal $20_2$ are used to connect the protection device 10 between a source of charge and a device to be protected, for example, one or more battery cells. Third terminal $20_3$ is connected to conducting path 24 and provides an electrical connection to a control circuit (e.g. transistor) which provides an over-voltage signal to protection device 10.

Figure 2A:
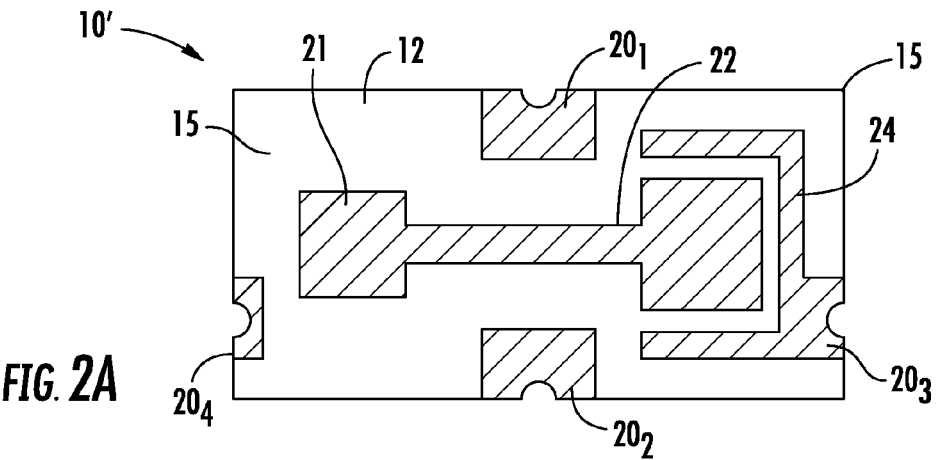
FIG. 2A-2I illustrate layers of a protection device in accordance with an alternative embodiment of the present disclosure.
Figure 2B:
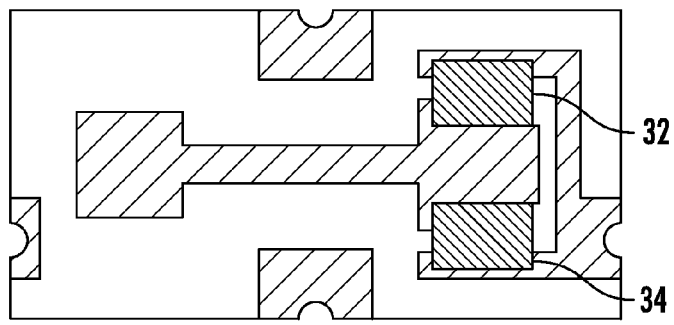

FIG. 2B illustrates a first resistive element 32 and second resistive element 34 disposed on and between conducting paths 22 and 24. Alternatively, a single resistor which extends between the paths may be used or just one resistor may be employed to create enough heat to melt at least one solder joint connected to a spring as described below.

Figure 2C:
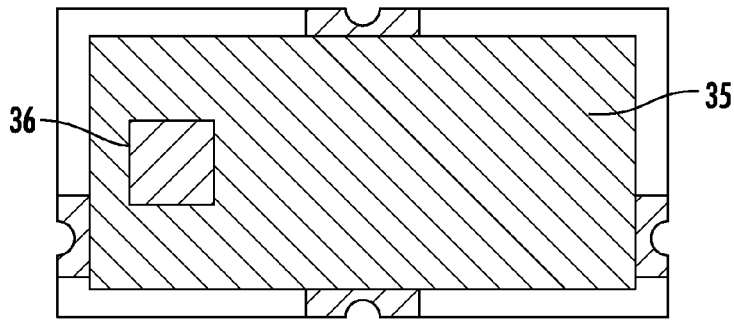

FIG. 2C illustrates a dielectric layer 35 disposed on substrate 15 which covers resistive elements 32 and 34. An opening 36 is formed through dielectric layer 35 to provide a connection means to conducting path 22. Dielectric layer 35 may be, for example, glass having a desired thermal conductivity to allow the heat generated by the resistors 32, 34 to pass therethrough.

Figure 2D:
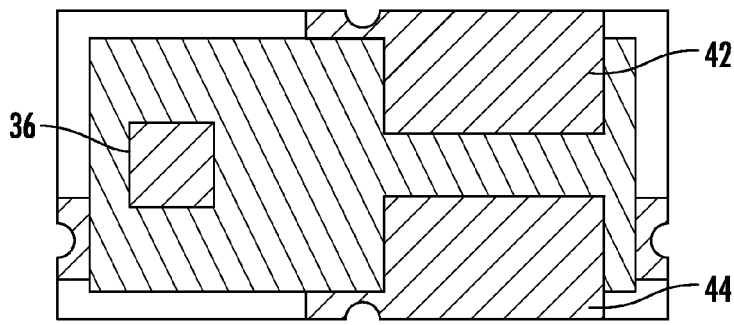

FIG. 2D illustrates a first conducting pad 42 disposed on dielectric layer 35 above first resistive element 32 and a second conducting pad 44 disposed on dielectric layer 35. First conducting pad 42 forms a connection with first terminal $20_1$ and second conducting pad 44 forms a connection with second terminal $20_2$.

Figure 2E:
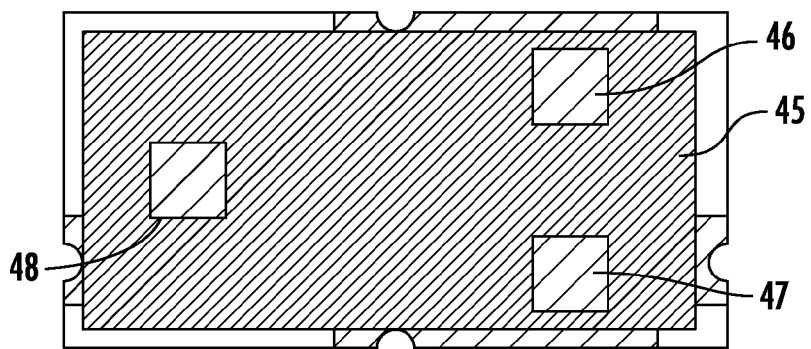

FIG. 2E illustrates a dielectric layer 45 for example, glass, is disposed partially over conducting pads 42, 44 and opening 36 resulting in exposed portions of the underlying conducting pads which become solder joint pads 46, 47 and 48. Low temperature melt solder is disposed on solder pads 46, 47 and 48. Pad 48 is used to conduct current from a spring (shown in FIG. 2F) to a control circuit via terminal $20_3$ during an abnormal circuit condition as discussed below.

Figure 2F:
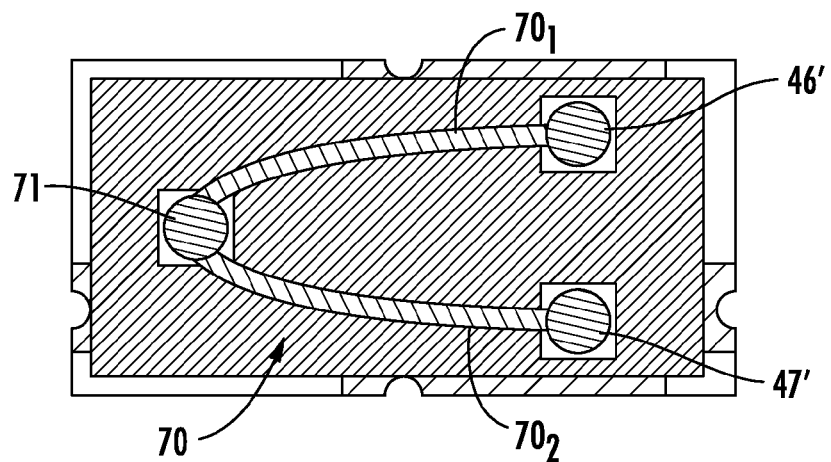
Figure 2G:
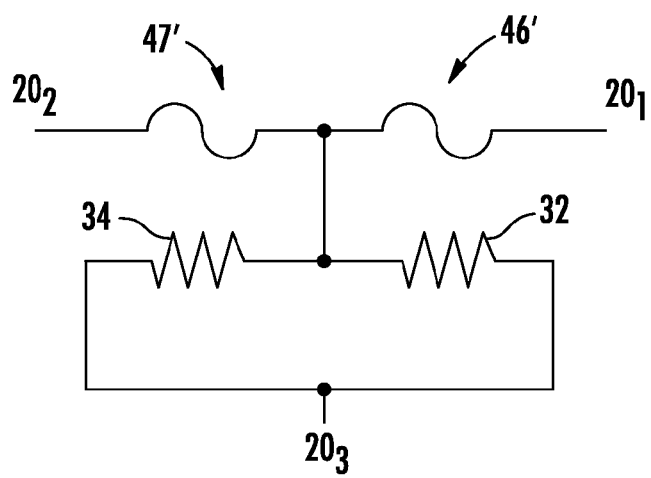

FIG. 2F illustrates a generally "V" shaped leaf-type spring 70 having a pair of sides $70_1$, $70_2$ extending from an apex portion 71. The respective ends 72, 74 of the sides $70_1$, $70_2$ are connected to solder pads 46 and 47 via solder 46', 47' and the apex is soldered to solder pad 48. Spring 70 may be made from, for example, high carbon steel plated with silver, a shape memory alloy material, or similar conducting material and may, of course, have alternative geometries attached to respective solder pads. A plastic cover is disposed over the circuit protection device 10' and glued about ledge 59 around the perimeter of substrate 12. FIG. 2G is a schematic view of the protective device 10' including resistive elements 32, 34, solder material 46', 47' and first terminal $20_1$, second terminal $20_2$ and third terminal $20_3$.

Figure 2H:
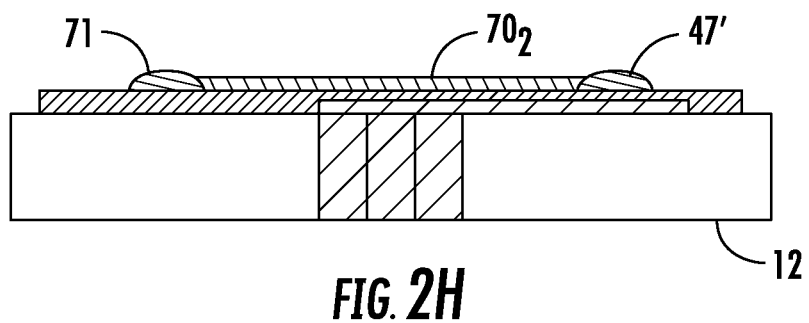

FIG. 2H is a side view of the protection device 10' utilizing a leaf spring 70 disposed on substrate 12 during normal current flow. During normal operation, current flows as described above with reference to FIGS. 1H and 1I. However in this embodiment, when an over voltage situation is detected at the load, a control circuit (not shown) connected to terminal $20_3$ closes the circuit and draws current from the spring 70 via conducting path 22. This current flows through resistors 32 and 34 which produces heat and melts one or more of the solder connections 46' and/or 47', thereby releasing one or more of the spring ends 72, 74.

Figure 2I:
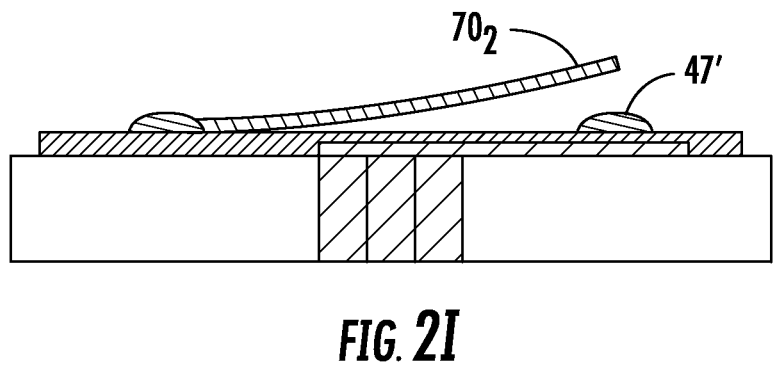

FIG. 2I is a side view of the protection device 10' after the leaf spring 70 is in an open position. The melting of one of more of the solder joints snaps at least one side $70_1$, and/or $70_2$ of spring 70 upwards which creates an open circuit thereby protecting the connected battery cells.

FIGS. 3A-3G illustrate a protection device 100 utilizing a spring in accordance with an alternative embodiment having a plurality of layers. In particular, FIG. 1A is a plan view of a first layer defined by metalized conducting paths 123 and 124 disposed on substrate 115. A first terminal $120_1$, second terminal $120_2$ and third terminal $120_3$ are used to connect the protection device between a source of charge and a power source such as, for example, a plurality of battery cells. A first resistive element 132 and second resistive element 134 are disposed on conducing paths 123 and 124.

Figure 3A:
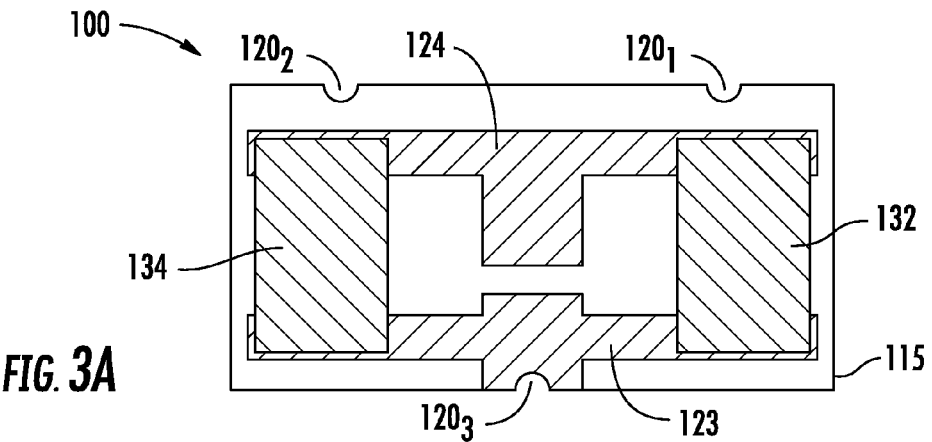
FIGS. 3A-3H illustrate layers of a protection device in accordance with an alternative embodiment of the present disclosure.
Figure 3B:
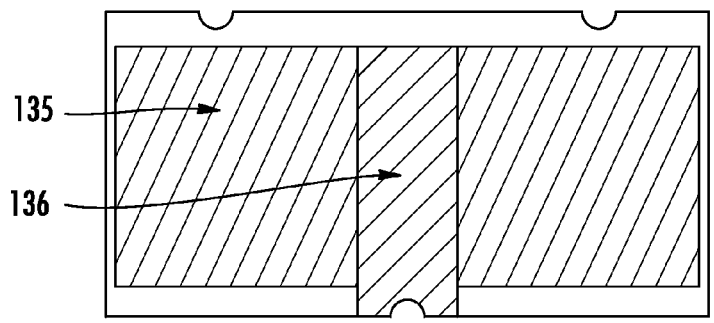
Figure 3C:
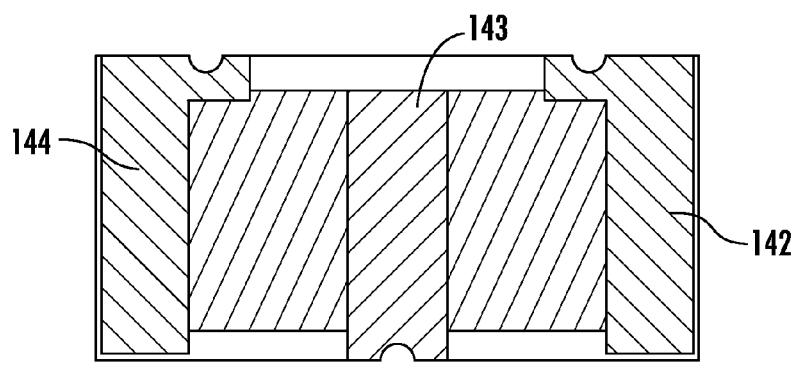
Figure 3D:
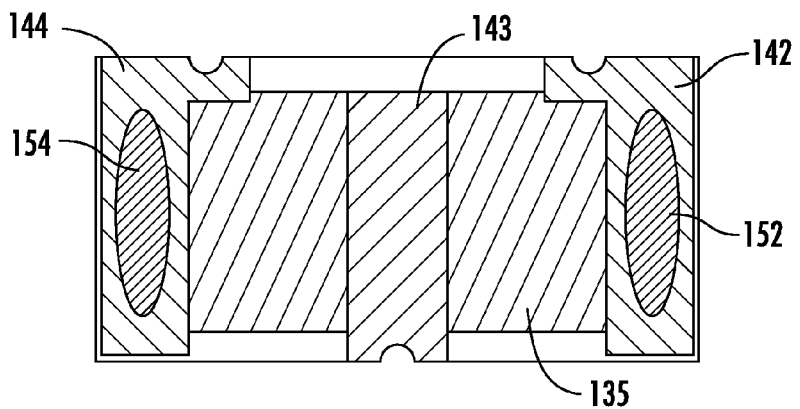

FIG. 3B illustrates a dielectric layer 135 disposed on substrate 115 which covers resistive elements 132 and 134. A opening 136 is formed through dielectric layer 135 to provide a connection means to conducting path 124. Dielectric layer 135 may be, for example, glass having a desired thermal conductivity to allow the heat generated by the resistors 132, 134 to pass therethrough. FIG. 3C illustrates a plan view of protective device 100 having a first conducting pad 142 disposed on dielectric layer 135 above first resistive element 132. A second conducting pad 143 is disposed on dielectric layer 135 and forms a connection with conducting path 124 through opening 136. A third conducting pad 144 is disposed on dielectric layer 135 above second resistive element 134. As shown in FIG. 3D, solder material 152 is disposed on first conducting pad 142 and solder material 154 is disposed on conducting pad 144. Both solders 152 and 154 may be a low temperature melt solder or one of solders 152 or 154 may be a low temperature melt solder and the other solder may be a high temperature melt solder. The low temperature melt solder employed is configured to melt at a desired temperature consistent with the heat produced by resistive elements 132 and 134 during an over-voltage or over-temperature condition.

Figure 3E:
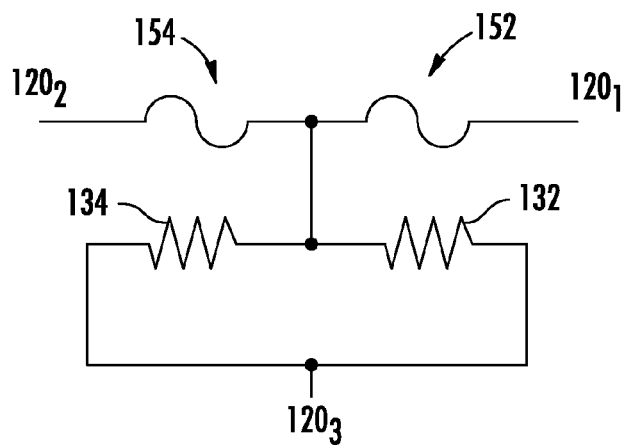

FIG. 3E is a schematic view of protective device 100 including resistive elements 132, 134, low melt solder material 152, 154 and first terminal $120_1$, second terminal $120_2$ and third terminal $120_3$.

Figure 3F:
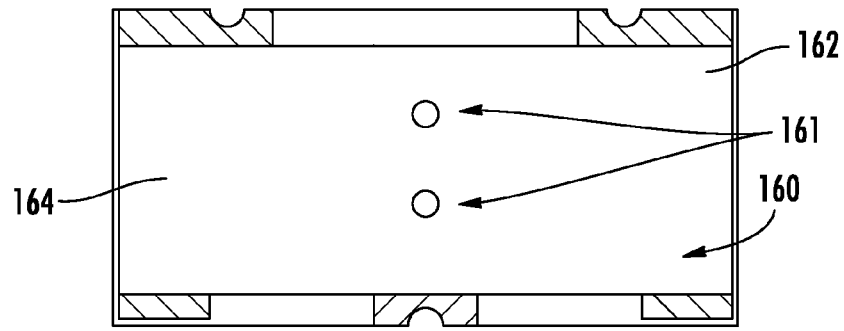

FIG. 3F is a plan view of another of the various layers of the protection device 100 disposed on substrate 115 including a spring 160 electrically connected to conducting pad 143 via weld areas 161. Although spring 160 is illustrated having a substantially rectangular shape, alternative configurations may be employed. A first end 162 of spring 160 is connected to conducting pad 142 via solder 152 and a second end 164 of spring 160 is connected to conducting pad 144 via solder 154. Spring 160 may be made from, for example, beryllium copper, high-carbon steel or other spring alloy. The spring may plated with a material such as silver or gold to increase its electrical conductivity. Alternatively, a low resistance shunt wire may extend of one end of the spring to the other to carry the majority of the current under normal battery charge and discharge operation.

Figure 3G:
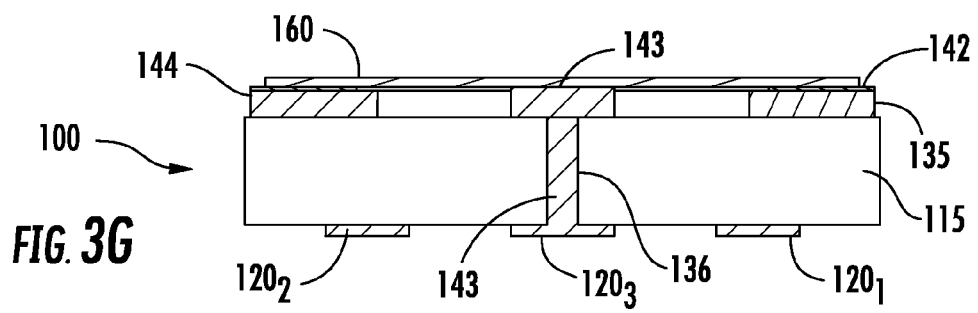

FIG. 3G is a side view of the various layers of protection device 100. In particular, spring 160 is connected to terminal $120_3$ by way of via 136 and conducting pad 143 a portion of which is disposed in via 136. Dielectric layer 135 is disposed between substrate 115 and conducting pads 142, 143 and 144. Spring 160 is disposed on conducting pad 143 conducting pads 142 and 144 via solder 152 and 154 respectively. During normal operation, current flows from terminal $120_1$ through conducting pad 142 to first end 162 of spring 160 via solder 152, through spring 160 to second end 164, to conducting pad 144 via solder 154 to terminal $120_2$ and onto the connected power source.

Figure 3H:
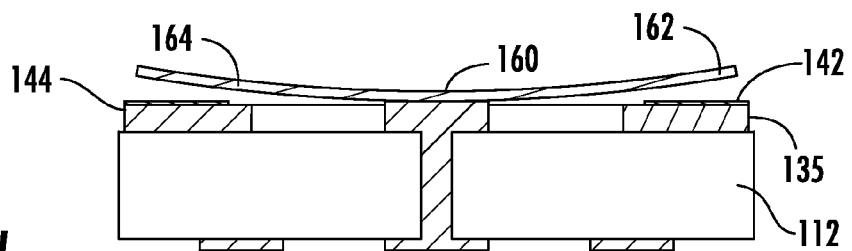

As shown in FIG. 3H, when an abnormal voltage or temperature situation is detected, a control circuit (not shown) connected to terminal $120_3$ closes the circuit and draws current from the spring 160 through conducting pad 143 disposed underneath the middle section of the spring 160 to conducting path 123 connected to terminal $120_3$. Because this current flows through resistors 132 and 134, heat is produced which melts one or more of the low melt solder joints 152 and/or 154. The melting of one of more of the solder joints 152 and/or 154 releases the spring at one or both ends 162, 164. The releasing of one or both ends 162, 164 of spring 160 away from the conducting pads 142, 144 opens the circuit thereby protecting the connected power source. In this manner, protection device 100 utilizes a spring disposed within a plurality of layers that produces an open circuit when an undesirable electrical condition occurs within a charging circuit.

Figure 4A:
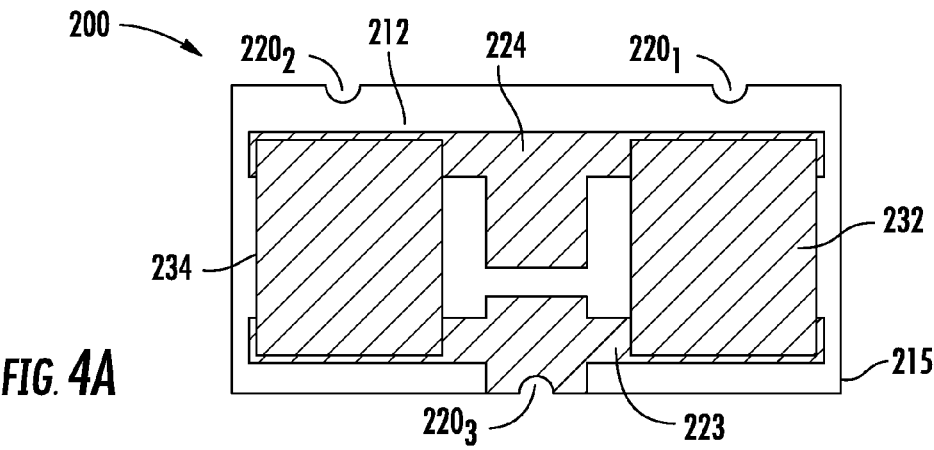
FIGS. 4A-4G illustrate layers of a protection device in accordance with an alternative embodiment of the present disclosure.

FIGS. 4A-4G illustrate a protection device 200 having a plurality of layers utilizing a diffusion layer to provide an open circuit configuration in accordance with an alternative embodiment. In particular, FIG. 4A is a plan view of a first layer defined by metalized conducting paths 223 and 224 disposed on substrate 215. A first terminal $220_1$, second terminal $220_2$ and third terminal $220_3$ are used to connect the protection device between a source of charge and a load such as, for example, a plurality of battery cells. A first resistive element 232 and second resistive element 234 are disposed on conducing paths 223 and 224.

Figure 4B:
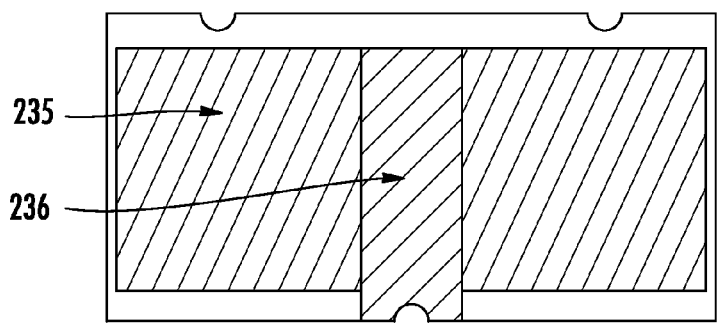
Figure 4C:
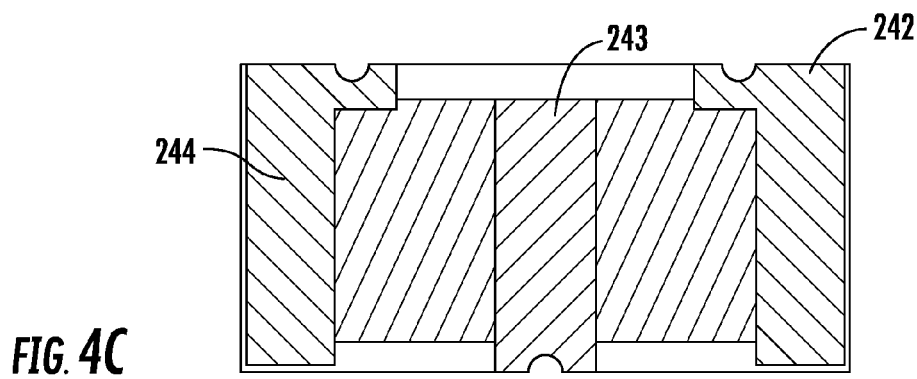

FIG. 4B illustrates a dielectric layer 235 disposed on substrate 215 which covers resistive elements 232 and 234. A via 236 is formed through dielectric layer 235 to provide a connection means to conducting path 224. Dielectric layer 235 may be, for example, glass having a desired thermal conductivity to allow the heat generated by the resistors 232, 234 to pass therethrough. FIG. 4C illustrates a plan view of circuit protection device 200 having a first conducting pad 242 disposed on dielectric layer 235 above first resistive element 232. A second conducting pad 243 is disposed on dielectric layer 235 and forms a connection with conducting path 224 through via 236. A third conducting pad 244 is disposed on dielectric layer 235 above second resistive element 234.

Figure 4D:
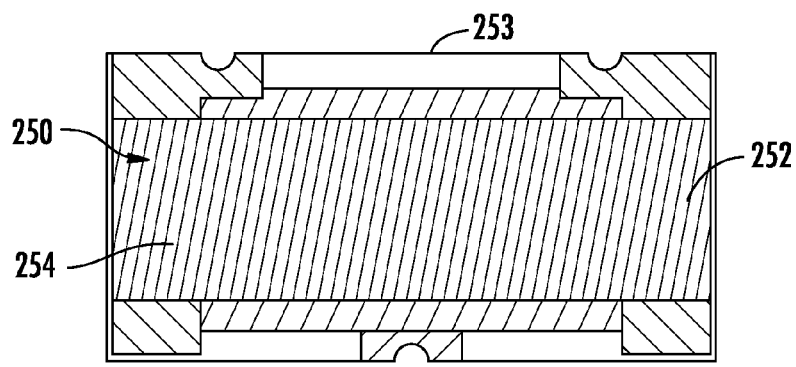

FIG. 4D is also a plan view of circuit protection device 200 wherein a diffusion layer 250 is disposed, at least partially, over the layer of conducting pads 242, 243 and 244. Diffusion layer 250 is defined by a first end 252 disposed over resistive element 232, a second end 254 disposed over resistive element 234 and a middle section 253 disposed over conducting pad 243. Diffusion layer 250 may be, for example a thin film of gold. The diffusion layer material employed is configured to diffuse into layers 235 and/or 260 at a desired temperature from heat generated by resistive elements 232, 234 associated with an abnormal circuit condition.

Figure 4E:
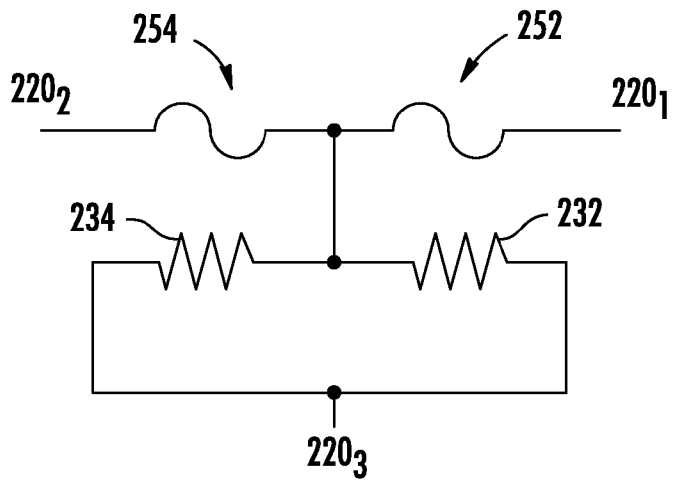

FIG. 4E is a schematic view of the diffusion layer circuit protection device 200 including resistive elements 232, 234, first terminal $220_1$, second terminal $220_2$, third terminal $220_3$ and diffusion layer end portions 252 and 254. During normal operation, current flows from terminal $220_1$ through conducting pad 242 to first end 262 of diffusion layer 250, through layer 250 to second end 254, to conducting pad 244 to terminal $220_2$ and onto the connected device.

Figure 4F:
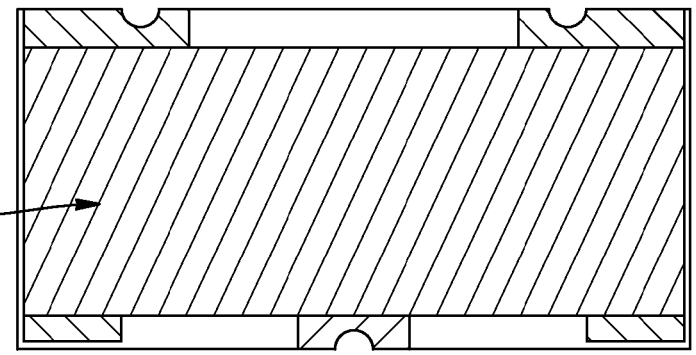
Figure 4G:
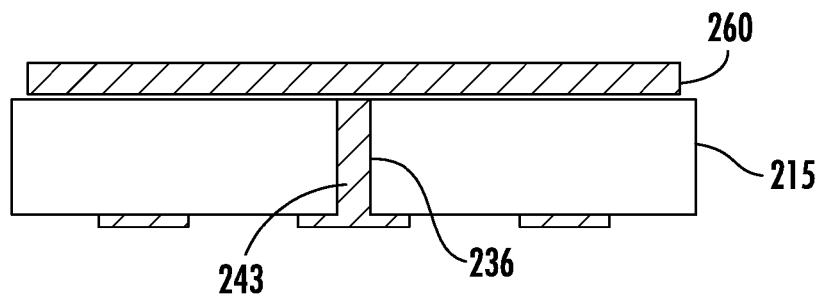

FIG. 4F is a plan view of circuit protection device 200 having a glass cover layer 260 disposed over diffusion layer 250 on substrate 215. FIG. 4G is a side view of the various layers of circuit protection device 200 illustrating glass cover layer 260 disposed on substrate 215 and conducting pad 243 filling via 236. Glass layer 260 is configured to absorb diffusion of layer 250 during an abnormal circuit condition. In particular, when an over-voltage or over-temperature situation is detected, a control circuit (not shown) connected to terminal $220_3$ closes the circuit and draws current from diffusion layer 250 through conducting pad 243 disposed underneath the middle section 253 of diffusion layer 250 to conducting path 223 connected to terminal $220_3$. Because this current flows through resistive elements 232 and 234, enough heat is produced which causes the diffusion layer end portions 252 and/or 254 disposed above resistive elements 232, 234 to diffuse into layers 235 and or 260. One or more portions diffuse into glass layer 235 and/or 260 which opens the circuit at one or both ends 252 and/or 254 of diffusion layer 250. The diffusion of one or both ends 252, 254 of layer 250 into glass layers 235 and/or 260 opens the circuit thereby protecting the connected device. In this manner, circuit protection device 200 utilizes a diffusion layer disposed within a plurality of layers that produces an open circuit when an undesirable electrical condition occurs within a charging circuit.

Figure 5A:
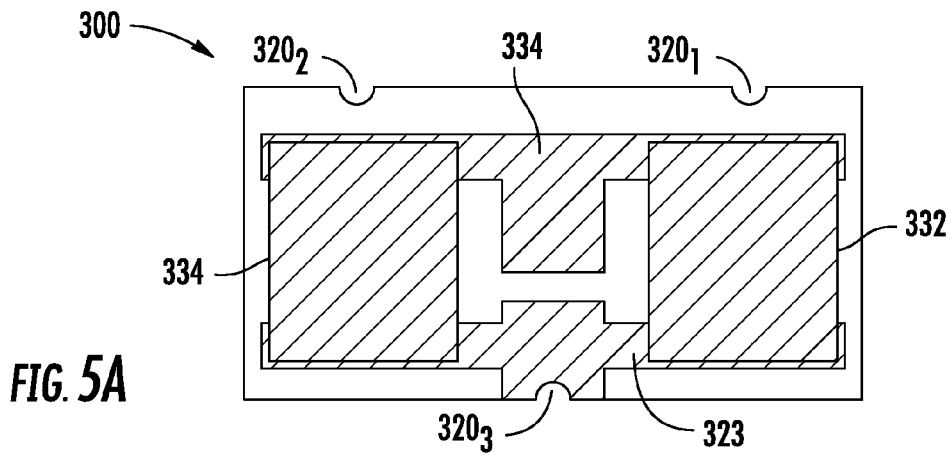
FIGS. 5A-5G illustrate layers of a protection device in accordance with an alternative embodiment of the present disclosure.

FIGS. 5A-5G illustrate a circuit protection device 300 having a plurality of layers utilizing a thermal link that, when opened, provides an open circuit configuration in accordance with an alternative embodiment. In particular, FIG. 5A is a plan view of a first layer defined by metalized conducting paths 323 and 324 disposed on substrate 315. A first terminal $320_1$, second terminal $320_2$ and third terminal $320_3$ are used to connect the circuit protection device between a source of charge and a power source such as, for example, a plurality of battery cells. A first resistive element 332 and second resistive element 334 are disposed on conducting paths 323 and 324.

Figure 5B:
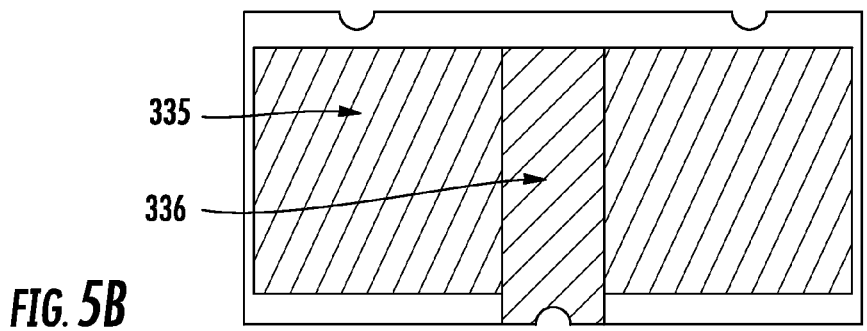
Figure 5C:
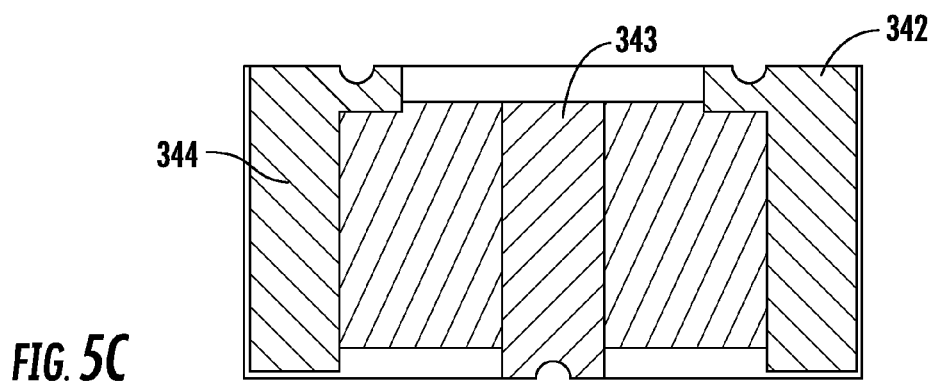

FIG. 5B illustrates a dielectric layer 335 disposed on substrate 315 which covers resistive elements 332 and 334. A via 336 is formed through dielectric layer 335 to provide a connection means to conducting path 324. Dielectric layer 335 may be, for example, glass having a desired thermal conductivity to allow the heat generated by the resistors 332, 334 to pass therethrough. FIG. 5C illustrates a plan view of circuit protective device 300 having a first conducting pad 342 disposed on dielectric layer 335 above first resistive element 332. A second conducting pad 343 is disposed on dielectric layer 335 and forms a connection with conducting path 324 through via 336. A third conducting pad 344 is disposed on dielectric layer 335 above second resistive element 334.

Figure 5D:
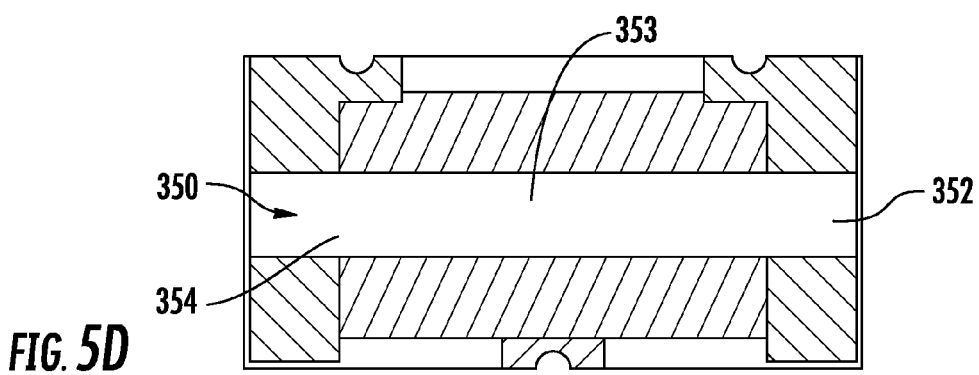

FIG. 5D is also a plan view of circuit protection device 300 wherein a thermal link layer 350 is disposed, at least partially, over the layer of conducting pads 242, 243 and 244 and dielectric layer 335. Thermal link layer 350 is defined by a first end 352 disposed over resistive element 332, a second end 354 disposed over resistive element 334 and a middle section 353 disposed over conducting pad 343. Thermal link layer 350 is configured with a low temperature melting point at least at the portions of first end portion 352 and second end portion 354 disposed over respective resistive elements 332 and 334. The thermal link layer employed is configured to melt at a desired temperature from heat generated by resistive elements 332, 334 associated with an over voltage condition.

Figure 5E:
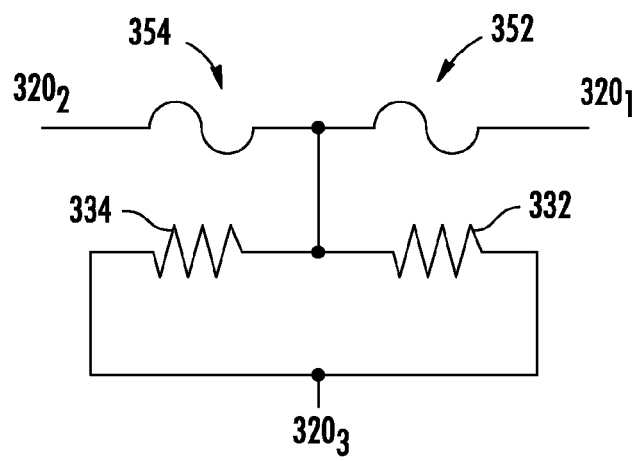

FIG. 5E is a schematic view of the thermal link layer circuit protection device 300 including resistive elements 332, 334, first terminal $320_1$, second terminal $320_2$, third terminal $320_3$ and thermal link portions 352 and 354. During normal operation, current flows from terminal $320_1$ through conducting pad 342 to first end 362 of thermal link layer 350, through layer 350 to second end 354, to conducting pad 344 to terminal $320_2$ and onto the connected load.

Figure 5F:
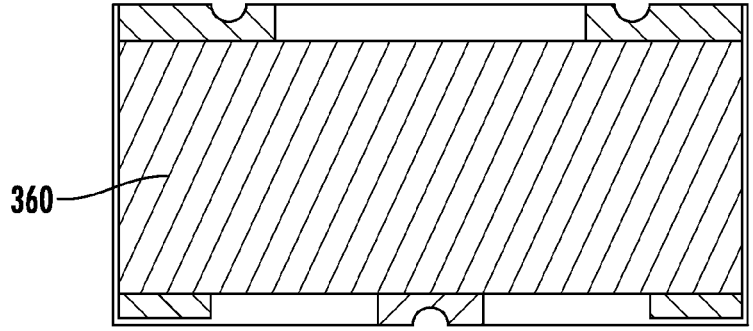
Figure 5G:
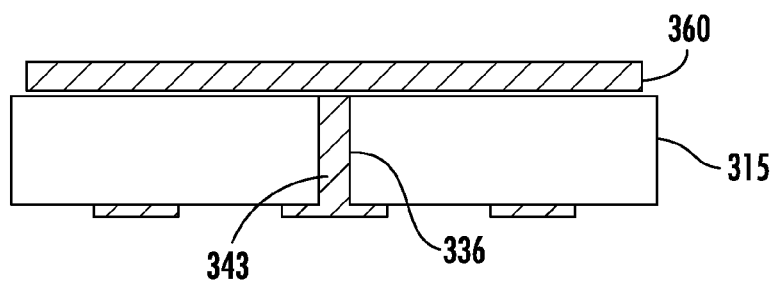

FIG. 5F is a plan view of circuit protection device 300 having a hot melt adhesive (HMA) cover layer 360 disposed over thermal link layer 350 on substrate 315. FIG. 5G is a side view of the various layers of circuit protection device 300 illustrating the HMA layer 360 disposed on substrate 315 and conducting pad 343 filling via 336. HMA layer 360 is configured to absorb thermal link layer 360 during an over voltage condition. In particular, when an abnormal circuit condition is detected at the load, a control circuit (not shown) connected to terminal $320_3$ closes the circuit and draws current from thermal link layer 350 through conducting pad 343 disposed underneath the middle section 353 of thermal link layer 350 to conducting path 323 connected to terminal 320₃. Because this current flows through resistive elements 332 and 334, enough heat is produced which melts one or more thermal link layer end portions 352 and/or 354 disposed above resistive elements 332, 334 which disperse into HMA cover layer 360. The one or more melted thermal link layer portions melt into HMA cover layer 360 which opens the circuit at one or both ends 352 and/or 354 of thermal link layer 350, thereby protecting the connected load. In this manner, circuit protection device 300 utilizes a thermal link layer disposed within a plurality of layers that produces an open circuit when an undesirable electrical condition occurs within a charging circuit.

FIG. 6 illustrates an exemplary embodiment of a cover 600 described with reference to FIGS. 1-5 and denoted in FIG. 5G as cover 360. Cover 600 is disposed over each of the circuit protection devices 10, 10', 100, 200 and 300 adhered around the perimeter of the respective substrates 15, 115, 215, and 315. Typically, cover 600 is bonded to the respective device using an epoxy, but alternative adhesives may be used. Cover 600 includes portions 601 which provide added surface areas around the cover 600 to allow for improved bond strength with the epoxy. In addition, portions 601 may have a roughened or textured surface to further improve bond strength with the epoxy. Through holes 602a . . . 602d may be disposed proximate respective portions 601. These holes may be tapered and used to receive epoxy or other adhesive and act as a "locking" feature for cover 600 on the respective substrates. In addition, the through holes 602a-602d may also be disposed at various locations on cover 600. By way of example, by using the combination of portions 601 and through holes 602, cover 600 is able to withstand a pull force up to about 5.8 lbs as compared to a typical industry standard of about 1.12 lbs.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A circuit protection device, comprising:
    a substrate;
    a conducting layer disposed on said substrate, said conducting layer having a first conducting path and a second conducting path;
    a first resistive element disposed on a first portion of the first conducting path and a first portion of the second conducting path;
    a second resistive element disposed on a second portion of the first conducting path and a second portion of the second conducting path;
    a dielectric layer disposed on the first and second resistive elements;
    a first conducting pad disposed on said dielectric layer and above said first resistive element, the first conducting pad connected to a first terminal;
    a third conducting pad disposed on said dielectric layer and above said second resistive element, the second conducting pad connected to a second terminal, the first conducting path connected to a third terminal;
    a diffusion layer disposed over said first and second conducting pads; and
    a glass layer disposed over the diffusion layer, wherein when an abnormal circuit condition occurs heat is generated by the first and second resistive elements which causes a portion of the diffusion layer to diffuse into the glass layer to create an open circuit between the first and second terminals.

2. The circuit protection device of claim 1, further comprising a via formed through said dielectric layer and electrically connected to said second conducting path.

3. The circuit protection device of claim 1, wherein the dielectric layer is glass having a desired thermal conductivity such that heat generated by the first and second resistive elements passes therethrough.

4. The circuit protection device of claim 1, wherein the diffusion layer is a thin film metallic layer.

5. The circuit protection device of claim 1, further comprising a control circuit connected to the third terminal, the control circuit configured to draw current from the diffusion layer during the abnormal circuit condition.

6. The circuit protection device of claim 2, further comprising a second conducting pad disposed on said dielectric layer and electrically connected to said second conducting path through said via and connected to said third terminal.

7. The circuit protection device of claim 4, wherein the diffusion layer is a thin film of gold.

* * * * *